(12) United States Patent
Mysore et al.

(10) Patent No.: US 11,924,027 B1
(45) Date of Patent: Mar. 5, 2024

(54) DETECTING NETWORK OPERATION VALIDATION ANOMALIES IN CONGLOMERATE-APPLICATION-BASED ECOSYSTEMS SYSTEMS AND METHODS

(71) Applicant: Citibank, N.A., New York, NY (US)

(72) Inventors: Vishal Mysore, New York, NY (US); Sukhbir Singh, New York, NY (US); Ramkumar Ayyadurai, New York, NY (US)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 18/495,628

(22) Filed: Oct. 26, 2023

(51) Int. Cl.
*H04L 41/22* (2022.01)
*H04L 41/069* (2022.01)
*H04L 41/16* (2022.01)

(52) U.S. Cl.
CPC ............ *H04L 41/069* (2013.01); *H04L 41/16* (2013.01); *H04L 41/22* (2013.01)

(58) Field of Classification Search
CPC .............................. H04L 41/069; H04L 41/22
See application file for complete search history.

(56) References Cited

U.S. PATENT DOCUMENTS 9,842,045 B2 * 12/2017 Heorhiadi ........... G06F 11/3692
2022/0311681 A1 * 9/2022 Palladino ............ H04L 41/0661

* cited by examiner

*Primary Examiner* — Adnan M Mirza
(74) *Attorney, Agent, or Firm* — Perkins Coie LLP (57) ABSTRACT

Systems and methods for reducing wasted computational resources by detecting network operation validation anomalies in conglomerate-application-based ecosystems are disclosed. The system provides a first network operation to a first software application of a set of software applications, where (i) the first network operation is configured to be provided as input to the first software application and (ii) the first software application generates a second network operation as output, using the first network operation, to be provided to a second software application. The system receives a first message associated with a processing of the first network operation at the first software application. The system then performs a determined validation process on the first message. In response to detecting that the determined validation process results in a failure to validate the first message, the system prevents the second network operation from being provided to the second software application.

14 Claims, 6 Drawing Sheets

DETECTING NETWORK OPERATION VALIDATION ANOMALIES IN CONGLOMERATE-APPLICATION-BASED ECOSYSTEMS SYSTEMS AND METHODS

BACKGROUND

Validating computing commands is currently a process that occurs as a last step of execution prior to obtaining a result. For example, when validating a login request, a computing system may compare a username and password to a stored set of username and password combinations. Where a match exists, the computing system may validate the login request, and enable a user access to one or more resources. However, as computing systems become more and more complex, the information passed between each system of the computing system may be modified. For example, in a chain of computing systems, a first computing system may modify an original message to be used as input for a second computing system. As the message has been modified, the second computing system may nonetheless process the message, only to determine that the message includes an error during a validation process, thereby wasting valuable computing resources (e.g., as the second computing system processed the erred message.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Given the complexity of modern computing systems, network operations may be modified as they pass from one computing system to another computing system. For instance, in the context of conglomerate-application-based ecosystems, a given system can include 20, 30, 40, or more different computing systems and/or software applications that a given network operation must "pass through" or be processed on. Each instance of where the given network operation may be processed by, passes through, or transmitted can introduce errors into the network operation. For example, where a first computing system (or software application) modifies a network operation, if done incorrectly, will effect each computing system or software application that is down-stream or parallel to the first computing system. As such, when a validation process is to occur (e.g., to verify the integrity of the network operation, to ensure that the data associated with the network operation is as intended, etc.), the network operation has passed through all computing systems, thereby wasting valuable computational resources (e.g., computer memory, processing power, processing cycles, and network bandwidth) that could otherwise have been used for other computational processes.

Existing systems have previously attempted to resolve such issues by utilizing computer and data scientists to manually review each computing system to determine where a validation error has occurred. However, such existing systems are practically infeasible to perform in real or near real time. For instance, modern day computing systems receive a large amount of data constantly. When performing a manual review of each computing system, let alone with respect to a given operation, the system must continue to run or otherwise face downtime, thereby decreasing the user experience (e.g., for those users who are using such systems) and increasing the amount of computing system down time.

Furthermore, as such systems are designed for speed to improve computational throughput, there is a lack of information available to check where, when, or how a validation error may have occurred. For example, existing systems do not currently have a mechanism to track how a modification to a network operation at an earlier system may effect another modification to a network operation at another system that is downstream from the earlier system. For example, as validation processes in existing systems occur after a network operation has been processed (e.g., to simply verify or authenticate the network operation after it has passed through all intended systems), an erred network operation has already been processed by each earlier system of the computing system based on the modified network operations before it, leaving little to no trace of where or how an error occurred. The only information that may be available are temporary log files that are removed from a computing system's storage in a short amount of time (e.g., 10 seconds, 1 minute, 1 hour, one day, etc.). When performing a manual review of these log files, the review may take days to weeks to even longer when detecting/diagnosing a system error or other validation anomalies. In connection with a temporary storage of log files, valuable information may be lost, and validation errors can continue to occur, negatively effecting the computing system and continuing to waste valuable computational resources.

For these and other reasons, there is a need for detecting network operation validation anomalies in real-time (or near-real time). There is a further need to store messages associated with a computing system's processing of a network operation. Furthermore, there is a need to track modifications to network operations across computing systems and their relation to such messages associated with a respective computing system's processing of the network operation. Lastly, there is a need to provide a real-time indication of a network operation validation anomaly at a given system within a computing system.

For example, as described above, existing systems have no (i) mechanism to store messages for later diagnostic review nor (i) mechanism to track modifications to network operations across computing systems and their relation to such messages. Without these mechanisms in place, computer scientists and data scientist like do not have adequate information available to them to diagnose a validation error. Not only may the lack of information cause hardship when determining where, when, or how a validation error has occurred, but given the sheer amount of information being received, transmitted, and processed by each system, attempting to determine such validation errors is a needle-in-a-haystack problem. Additionally, without a mechanism to provide a real-time indication of network operation validation anomalies (or network operation validation error), existing systems further waste valuable computational resources as erred network operations are able to pass from one system to another system, often undetected until it is to late.

To overcome these and other deficiencies of existing systems, the inventors have developed systems and methods for detecting network operation validation anomalies in conglomerate-application-based ecosystems. For example, the system can provide a first network operation to a first software application of a set of software applications, where (i) the first network operation is configured to be provided as input to the first software application and (ii) the first software application generates a second network operation as output, using the first network operation, to be provided to a second software application of the set of software applications. For a conglomerate-application-based ecosystem that is an ecosystem comprising a set of software applications, the system can track which software applications a network operation originates from, as well as which software applications a network operation is destined to be received at.

The system can receive a first message (e.g., a log file, metadata, a notification, etc.) that is associated with a processing of the first network operation at the first software application. For instance, the system receives the first message that indicates a set of characteristics associated with the processing of the first network operation to determine a validation process to be performed on the first message. That is, as opposed to existing systems that may merely validate an operation at the end of a given process, the inventors have developed a system that validates each network operation at each software application (or system) of a set of software applications (or systems). In this way, the system can determine in real time whether a validation anomaly has occurred, thereby reducing wasted computational resources (e.g., as an invalid network operation is not passed to other downstream systems). Moreover, by receiving such messages in relation to the processing of the network operation, the system provides a mechanism for tracking where, when, and how a given network operation validation anomaly may have occurred, thereby improving existing network operation validation detection methodologies.

The system can determine a validation process to be performed on the first message using (i) the first network operation, (ii) the second network operation, and (ii) the characteristics associated with the processing of the first network operation. For example, the system may compare the input and the outputs of the network operation being processed with respect to the first message to determine which validation process is to be performed on the first message. In this way, where multiple validation processes exist within an ecosystem (e.g., as each system may correspond to its own validation process), the system may maintain robustness and adaptability for detecting network operation validation errors. The system can also, in response to detecting that the determined validation process results in a failure to validate the first message, prevent the second network operation (e.g., the output from the first software application) from being provided to the second software application (e.g., a destined software application that receives the output from the first software application). In this way, the system further reduces the amount of wasted computational resources as error-prone or invalid network operations are not passed down to, or processed by downstream software applications.

In various implementations, the methods and systems described herein can reduce wasted computational resources by detecting network operation validation anomalies in conglomerate-application-based ecosystems. For example, the system may provide a first network operation to a first software application of a set of software applications, where the first network operation is configured to be provided as input to the first software application and (ii) the first software application generates a second network operation as output, using the first network operation, to be provided to a second software application of the set of software applications. The system can receive a first message associated with a processing of the first network operation at the first software application, where the first message indicates a set of characteristics associated with the processing of the first network operation. The system can determine a validation process to be performed on the first message using identifying information associated with the first software application. The system can perform the determined validation process on the first message using (i) the first network operation, (ii) the second network operation, and (iii) the characteristics associated with the processing of the first network operation. In response to detecting that the determined validation process results in a failure to validate the first message, the system can prevent the second network operation from being provided to the second software application of the set of software applications.

In the following description, for the purposes of explanation, numerous specific details are set forth in order to provide a thorough understanding of implantations of the present technology. It will be apparent, however, to one skilled in the art that implementation of the present technology can practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

Figure 1:
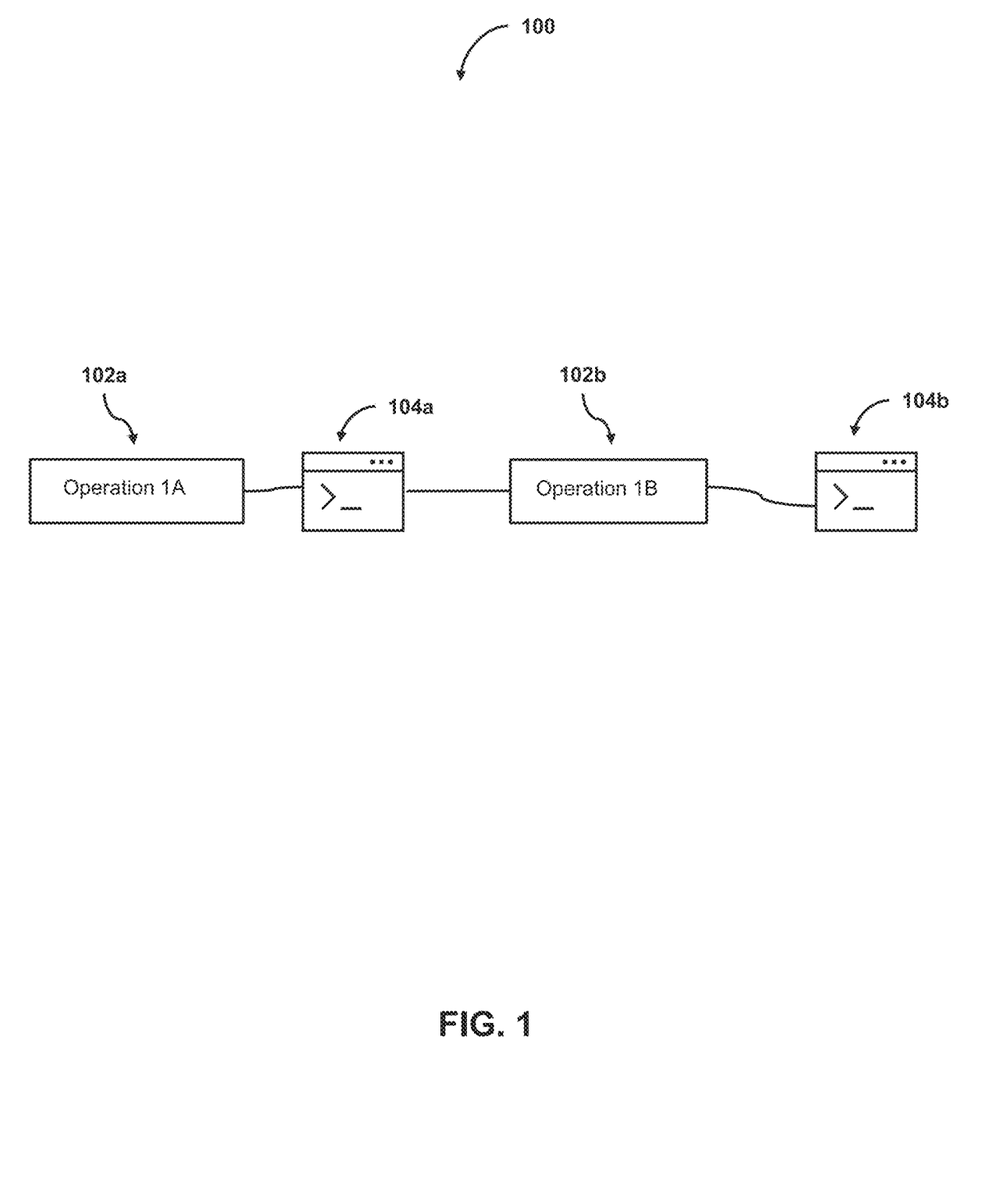
FIG. 1 is an illustrative diagram representing a conglomerate-application-based ecosystem processing a network operation, in accordance with some implementations of the present technology.

FIG. 1 is an illustrative diagram representing a conglomerate-application-based ecosystem processing a network operation, in accordance with some implementations of the present technology. For example, a conglomerate-application-based ecosystem 100 can include a network operation 102 (e.g., or collectively referred to as network operations 102a-102b), software application 104 (e.g., or collectively referred to as a set of software applications 104a-104b), or other components. The conglomerate-application-based ecosystem 100 can provide a first network operation 102a to a first software application 104a of a set of software applications. Second network operation 102b can be the result of processing first network operation 102a at the first software application 104b, where second network operation 102b is to be received as input to second software application 104b. In some implementations, conglomerate-application-based ecosystem 100 can include more or less network operations and software applications. For purposes of brevity and for understanding, the conglomerate-application-based ecosystem is shown at a micro-level to avoid confusion. A macro-level view of the conglomerate-application-based ecosystem may include 3, 4, 5, . . . , 10, . . . , 100, . . . , 1000 or more software applications or network operations.

A network operation (e.g., first network operation 102a) can be any operation that is to be processed by, transmitted to, provided to, or is related to one or more software applications. For example, a network operation may be any piece of data, that when processed by a software application, results in an output. In some implementations, a network operation, when processed by a software application, may result in another network operation being generated. For example, where a network operation is an email, and the software application is a white-space remover, the output of the white-space remover application can generate a second network operation (e.g., the email with all whitespace removed). As another example, where a network operation is a capital market trade (e.g., a stock trade, a stock transaction, a security trade, a security transaction) and the software application is a response handler application (e.g., to route the capital market trade to another system), the output of the response handler may modify the capital market trade by updating a sender field, thereby generating a second network operation.

A software application (e.g., first software application 104a) can be any software application configured to process input data (e.g., a network operation). For example, a software application can be any computer program that carries out a task, such as manipulating text, numbers, audio, graphics, or other input data. As another example, a software application may be a microservice software application. In some implementations, a software application can modify an input network operation and generate an output network operation. For instance, a software application can receive, as input, a first network operation. The software application can process the first network operation (e.g., using one or more instructions, rules, etc., that is associated with the software application) and cam generate a second network operation (e.g., an output). The second network operation can be a modified network operation (e.g., a second network operation). However, in some implementations, the software application may process a network operation such that the network operation is not modified. For example, the software application may validate information included in, or part of, a first network operation and may produce an output (e.g., a second network operation) that matches the input network operation (e.g., the first network operation), in accordance with some implementations of the present technology.

In one use case, where the conglomerate-application-based ecosystem 100 is a Capital Market Software system, each software application (e.g., software application 104a, software application 104b, etc.) can be software designed to facilitate one or more functionalities involved with processing a capital market trade. For example, first network operation 102a may be a capital market trade that is to be completed. First network operation 102a may be transmitted to first software application 104a of a set of software applications 104a-104b. To facilitate the trade, the capital market trade (e.g., first network operation 102a) may pass through or be processed by one or more software applications. For instance, first software application 104a may receive the first network operation 102a as input, and may generate an output (e.g., second network operation 102b). The second network operation 102b can be related to first network operation 102a (e.g., as second network operation 102b originated from a processing of the first network operation 102a at the first software application 104a). For example, the second network operation 102b may include information that may match, or be a modified version of first network operation 102a. Second network operation 102b may be destined for input to second software application 104b (e.g., to facilitate the capital market trade).

In such a Capital Market Software system-context, however, ensuring the integrity of capital market trades is an arduous task that involves multiple software applications, systems, or other components. For instance, throughout the lifecycle of a given capital market trade, the trade may pass through or be processed by trading platforms (e.g., third party trading platforms), order management systems, trading algorithm models, post trade clearing and settlement systems, risk management tools, market data systems, compliance and regulatory reporting applications, or more. In some implementations, such platforms, systems, models, tools, and applications may be represented by one or more of the set of software applications 104a-104b. However, it should be noted, that for sake of clarity, FIG. 1 shows two software applications.

In the context of such Capital Market Software systems, compliance with industry regulations, ensuring that trades are facilitated accurately (e.g., without error), and are facilitated in real-time (or near-real time) is of the upmost importance. However, existing systems currently fail by not having the proper validation techniques in place. For example, currently, when a trade is facilitated, a validation process (or authentication process) only occurs at the end or near the end of the trade. That is, existing systems rely on the completion of a trade to validate one or more values (e.g., amounts, timestamps, etc.) are valid with respect to the original trade.

Contributing to this issue, existing systems currently lack sufficient information to accurately diagnose a trade validation issue. For example, although existing systems may have access to raw data being transmitted and processed among a set of systems (e.g., software applications), this raw data is not easily understood due to an amount of financial and regulatory data included therein. As capital market systems process hundreds of thousands trades per day, manually parsing and analyzing this sheer amount of raw data is infeasible for the human mind to analyze and is error prone as such analytics rely on the mere opinion of computer and data scientists attempting to determine a network operation validation anomaly.

However, to combat these issues, the conglomerate-application-based ecosystem provides a mechanism for performing a validation process at each software application that is part of the conglomerate-application-based ecosystem. For example, for each software application of the set of software applications (e.g., software applications 104a-104b), a corresponding validation process may be performed on (i) an input network operation to a given software application, (ii) an output network operation from the processing of the given software application, and (iii) a message that is associated with the processing of the input network operation at the given software application. In this way, the system performs a validation process at each instance that a network operation is provided to a software application, thereby providing the ability to detect network operation validation anomalies in real time.

Moreover, the conglomerate-application-based ecosystem can store each message that is associated with the processing of a network operation at a given software application. For example, where the message is a log message that indicates characteristics associated with the processing of the network operation, the system may store each log message in association with (i) an input network operation, (ii) a software application, and (iii) the output network operation. In this way, the system may provide traceability of each microtransaction (e.g., each network operation) that occurs within a computing system for detecting network operation validation anomalies.

Furthermore, the conglomerate-application-based ecosystem may not only provide an indication to a user (e.g., a computer scientist, a stock broker, a data scientist, etc.) that a given network operation (e.g., a trade) has failed to be validated at some point within the conglomerate-application-based ecosystem, but also prevent a network operation from being provided to a downstream software application. For example, where the conglomerate-application-based ecosystem determines that a validation process results in a failure to validate a message (e.g., a log file) associated with the processing of the first network operation 102a at the first software application 104a, the system can prevent the second network operation 102b from being provided to (e.g., transmitted to) the second software application 104b. In this way, the system reduces the amount of wasted computational resources as a network operation that has failed to validate (or is otherwise associated with an error) is not passed on to downstream computing systems/software applications. By doing so, the system can provide real-time notifications to users and can provide real-time network operation validation anomaly detection, thereby improving the user experience, decreasing system downtime, and providing enhanced software application/computing system analytics.

Suitable Computing Environments

Figure 2:
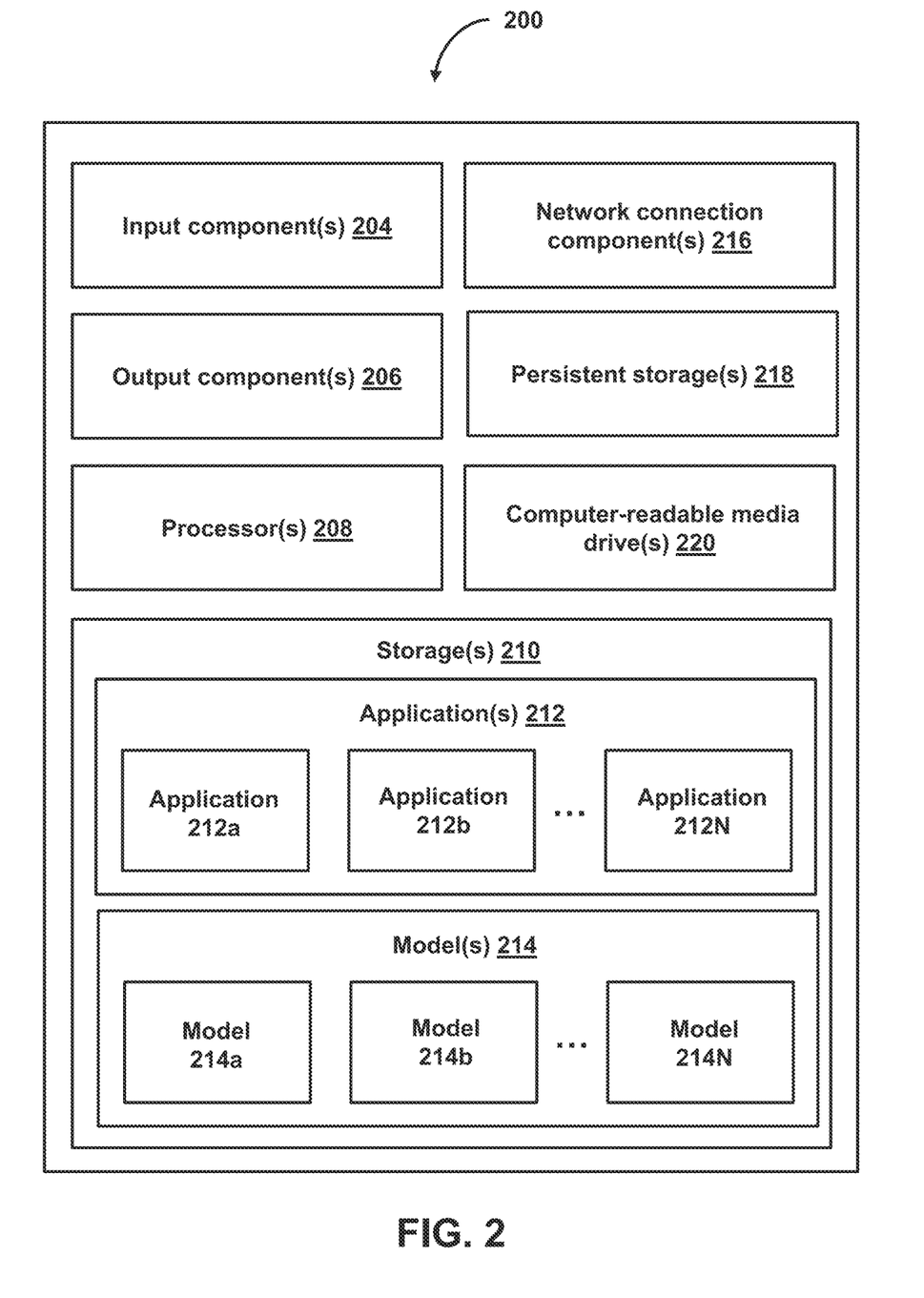
FIG. 2 is a block diagram showing some of the components typically incorporated in at least some of the computer systems and other devices on which the disclosed system operates in accordance with some implementations of the present technology.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, touch screens, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212, model(s) 214), and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
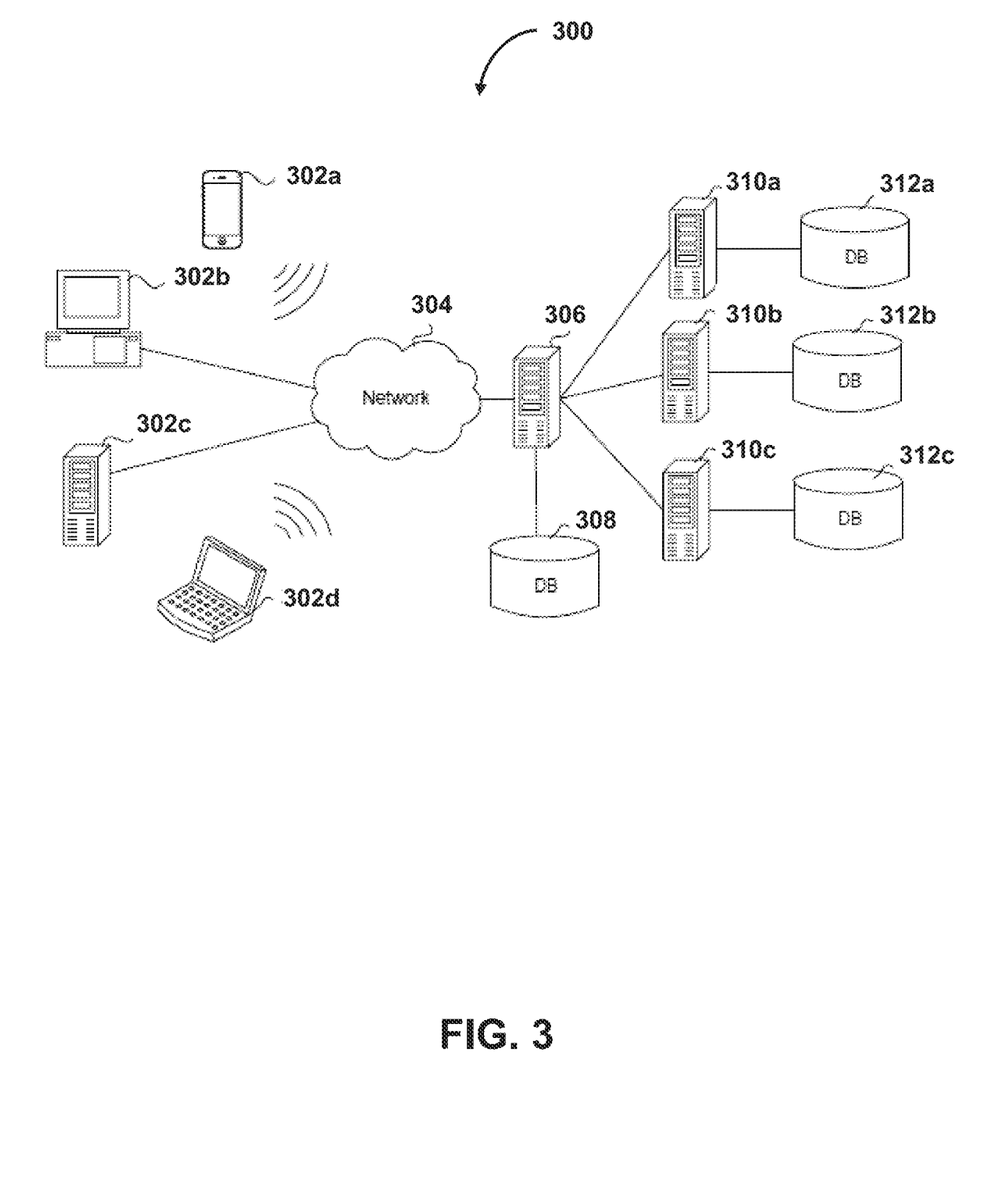
FIG. 3 is a system diagram illustrating an example of a computing environment in which the disclosed system operates in some implementations of the present technology.

FIG. 3 is a system diagram illustrating an example of a computing environment in which the disclosed system operates in some implementations. In some implementations, environment 300 includes one or more client computing devices 302a-d, examples of which can host the conglomerate-application-based ecosystem 100 (or other system components). For example, the computing devices 302a-d can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310a-c. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310a-c) connect to a corresponding database (308, 312a-c). As discussed above, each server computing device 310 can correspond to a group of servers, and each of these servers can share a database or can have its own database. Databases 308 and 312 warehouse (e.g., store) information such as, predefined ranges, predefined thresholds, error thresholds, graphical representations, messages (e.g., notifications, log files, characteristics, etc.), validation processes, machine learning models, artificial intelligence models, sets of rules, linked set of rules, tags, historical messages, timestamps, identifiers (e.g., software application identifiers, validation process identifiers), validation process rules, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN), but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Detecting Network Operation Validation Anomalies

Figure 4:
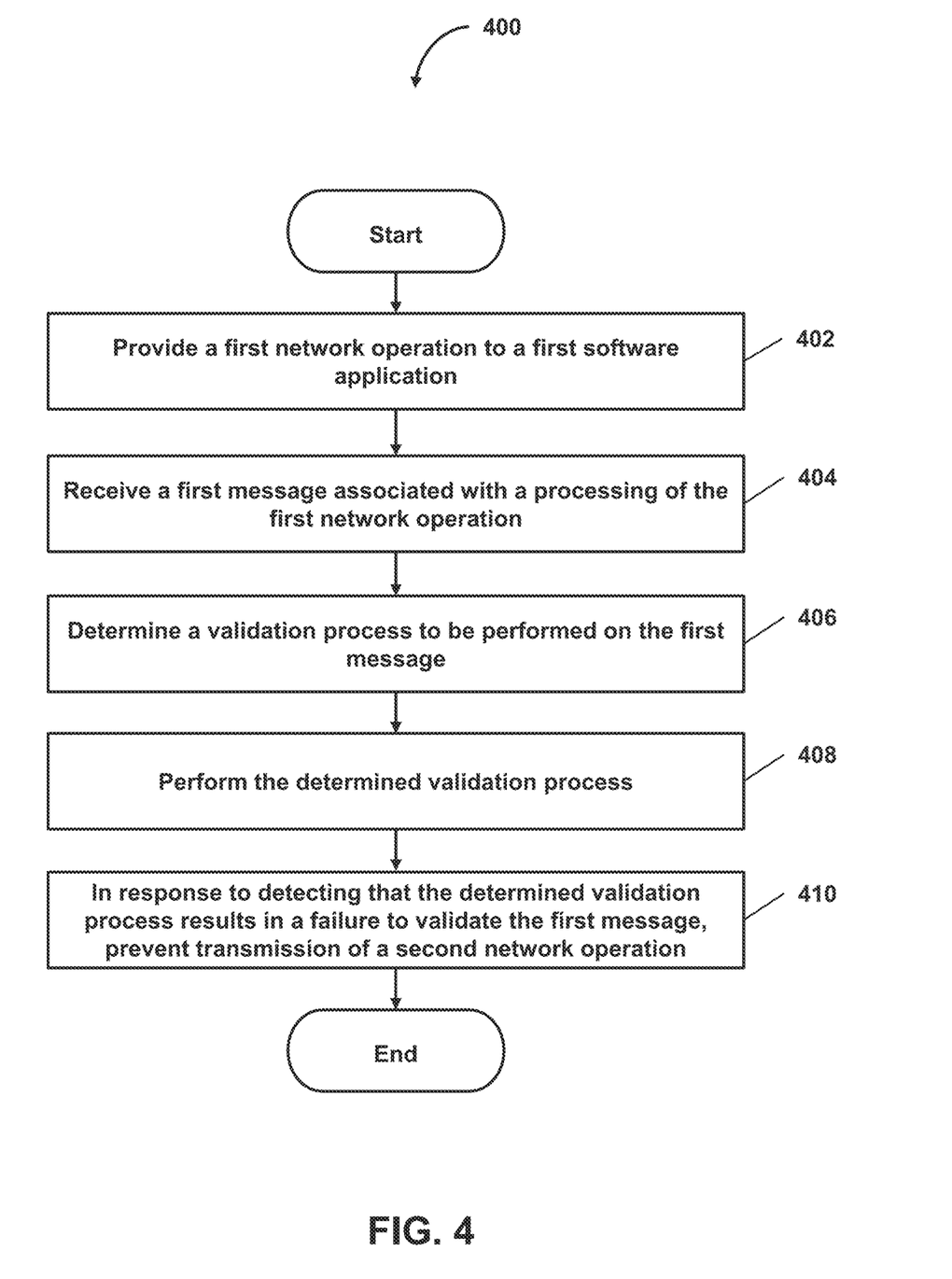
FIG. 4 is a flow diagram illustrating a process of reducing wasted computational resources by detecting network operation validation anomalies in conglomerate-application-based ecosystems, in accordance with some implementations of the present technology.

FIG. 4 a flow diagram illustrating a process of reducing wasted computational resources by detecting network operation validation anomalies in conglomerate-application-based ecosystems, in accordance with some implementations of the present technology.

At act 402, process 400 can provide a first network operation to a first software application. For example, process 400 can provide a first network operation to a first software application of a set of software applications. The first network operation may be configured to be provided as input to the first software application, and the first software application can generate a second network operation as output using the first network operation. For example, the first network operation may be provided to a microservice software application involved in processing a capital market trade (e.g., transaction). The microservice software application may process the capital market trade (e.g., by updating one or more data fields (e.g., tags) associated with the trade, removing one or more data fields, or transforming one of more data fields). As a result of the processing of the first network operation, the system generates a second network operation. For example, the second network operation may be configured to be provided as input to a second software application. As an example, the second software application may be another software application that is part of the conglomerate-application-based ecosystem. In the context of capital market systems, the second software application may be a microservice software application that is configured to accept the second network operation as input.

In one use case, the first network operation can be an order (e.g., order for a capital market trade, a stock exchange, a security trade, etc.). The first network operation may include information such as a security type (e.g., a type of capital market asset being traded), a quantity (e.g., of how many shares of a given asset is to be traded, purchased, or sold), a price of the security or asset, or other information. Such information can be in the format of an Financial Information Exchange (FIX) protocol (e.g., a FIX message). For example, the FIX message may include a set of tags that represents the information associated with the first network operation (e.g., the security type, quantity, price, timestamp associated with the generation of the FIX operation, sender, target, order ID, etc.). As another example the FIX message may include tags such as mandatory tags, compliance tags, timestamp tags, repeating group tags, length tags, persisted tags, transformed value tags, or other tags.

Mandatory tags may be tags that are required to ensure proper FIX message processing and adherence to FIX protocol standards. Compliance tags may capture regulatory information (e.g., for regulatory/compliance analysis) or facilitating reports (e.g. financial reports). Timestamp tags may include a timestamp at which a given network operation was processed to synchronize timing events throughout a network operation's lifecycle (e.g., a given security trade). Repeating group tags may represent multiple instances of data (e.g., repeated tags, complex network operation formats, or combined tags). Length tags may indicate a length of a given data field or tag. For instance, as each tag is associated with a given value (e.g., a timestamp value, an identifier, a modification, etc.), the length tag may ensure that data associated with such tags are not truncated or corrupted. Persisted tags may include information that ensures data consistency across various stages. For example, persisted tags may be tags that do not change with respect to processing network operations that may be used as a "check" value. Lastly, transformed tags may include an indication as to which tags and which values associated with respective tags have been modified or updated based on a processing of a network operation at a given software application. In this way, the system uses such tags to validate network operations with respect to (i) a software application's processing of the network operation and (ii) an output of the software application (e.g., a second network operation) to ensure data integrity.

The first network operation can be provided to a first microservice software application for initial processing. For example, the first microservice software application may determine where the first network operation is to be routed. The first microservice software application can update one or more tags associated with the FIX message by processing the FIX message, and may generate an output (e.g., a second network operation) that is to be provided to a downstream software application (e.g., a second microservice software application). Such downstream software applications may refer to any software applications that are configured to receive data (e.g., FIX messages) that occur in succession. For instance, downstream software applications may refer to any software application that is configured to receive data from a prior software application.

In some implementations, process 400 can detect a transmission of a first network operation to a first software application of a set of software applications. For example, process 400 may receive an indication (e.g., a timestamp, a notification, a transmission message, etc.) that indicates that a network operation is, or has been, transmitted to a given software application. In this way, the system detects in real time, whether a network operation has been transmitted to one system (e.g., software application) to another system (e.g., another software application) to facilitate real-time detection of network operation validation anomalies.

At act 404, process 400 can receive a first message associated with a processing of the first network operation. For example, the first message may be a log file associated with the processing of the first network operation. The first message can be generated in response to the first software application processing the first network operation for use in validating one or more network operations. As an example, the first message may indicate a set of characteristics associated with the processing of the first network operation. The set of characteristics can include information pertaining to (i) an input network operation, (ii) a software application, (iii) an output network operation, or other information. As an example, the set of characteristics may include all of the information of the first network operation (e.g., FIX tags associated with the first network operation), the first software application identifier, a timestamp associated indicating what time the first software application processed the first network operation, the information of the second network operation (e.g., the FIX tags associated with the second network operation), or other information. The first message (e.g., a first log file) can include such information to validate one or more network operations. Additionally, the first message (e.g., the log file) may be in a XLM, JSON, FIX, or FIX4 format.

As FIX tags change constantly based on the processing of a FIX message at a given system or software application within the conglomerate-application-based ecosystem, log files may be generated by the software applications that process such FIX messages. The log files provide valuable information as to any inconsistencies amongst the FIX messages (e.g., when received as input, when generated as output), whether any timestamps associated with the processing of a FIX message is out of range of another FIX message, whether any errors are present within the software application (e.g., incorrectly modifying a FIX tag of an input FIX message), or other information. As an example, when FIX messages are passed through or passed to varying software applications within the conglomerate-application-based ecosystem, such FIX messages may undergo modifications such as the removal, updating, or addition of FIX tags within the FIX messages. As such, log files can be used for functional, regulatory, or compliance integrity analysis by capturing these changes and storing them in a database for later retrieval when a validation anomaly is detected.

For example, as opposed to existing systems which do not actively store such log messages for validation purposes (or in association with given software applications), process 400 stores such messages (e.g., log messages) in association with the software application to which processed a given network operation. For instance, even when existing systems store log files for later use, such log files are difficult to access based on the complexity of information stored within such files. To overcome this, the conglomerate-application-based ecosystem stores messages (e.g., log files) in association with the software application to which processed a given network operation for efficient retrieval. For example, the system may store a log message in a dictionary style database, where the key (e.g., for a key/value pair) is the software application identifier (e.g., a first software application identifier, a first microservice software application identifier) and the value is a log file identifier (e.g., a value indicating a timestamp at which the log file was created, a pointer to the log file that was generated based on the processing of the network operation, etc.). In this way, the system may reduce the utilization of computational resources by enabling a faster retrieval of the log file (e.g., as opposed to a parsing of all available log files stored in a database).

At act 406, process 400 can determine a validation process to be performed on the first message. For example, process 400 can determine the validation process to be performed on the first message using identifying information associated with the first software application. As an example, each software application of the set of software applications that are part of the conglomerate-application-based ecosystem can be associated with an identifier. The identifier may be an integer, decimal, hexadecimal, alpha-numeric, string, or other value that is unique to a given software application. As each software application of the set of software applications can perform different processes (e.g., modify, add, remove FIX tags, generate multiple network operations from an input network operation, etc.), each software application may have a unique validation process to be performed on a given message.

For instance, process 400 can access a database indicating a set of validation processes. Each validation process of the set of validation processes may be a set of rules (e.g., predetermined validation rules) that uses information from (i) the first network operation, (ii) the first message (e.g., the log file generated from the processing of the first network operation at the first software application), or (ii) the second network operation. For example, the set of rules can use tag values from the first network operation and compare one or more tag values of the first network operation to one or more tag values in (i) the second network operation or (ii) the characteristics indicated in the first message.

As one example, a validation process can include a set of rules, a software application identifier, and one or more linked rules (e.g., to the current rule). For example, an exemplary validation process is shown below.

{Rule Name: "OMS-ALGO"
When
Condition
Then
Validate.ComplianceTags
Validate.MandatoryTags
Validate.TimeStampTags
Validate.Linked(Rule Name: ALGO-EXCHANGE, CurrentRuleTag, LinkedRuleTag)
ReportDashboard
End}

The software application identifier (e.g., "Rule Name" field) can correspond to the software application that processed a given network operation. The "When" field may indicate a condition as to the occurrence of the triggering of the validation (e.g., a time at which the validation process will execute). The "Condition" field can indicate a condition value of a conditional tag. The "Then" field indicates which Tags of a given network operation may be validated (e.g., checked for a matching, checked for integrity, etc.). The "Validate.Linked" filed may indicate another validation process that is to occur, as well as specified parameters to pass to the other validation process. As such, each validation process can be linked to (e.g., cause execution of) one or more other validation processes of the set of validation processes.

As the messages (e.g., first message, a log message, etc.) can include characteristics associated with the processing of a network operation (e.g., a first network operation) at given software application (e.g., the first software application), such as the tags of an input network operation (e.g., the first network operation), an identifier of a software application that processed the input network operation (e.g., the first software application), and the tags of an output network operation (e.g., the second network operation), process 400 may use the characteristics of the first message to perform the validation of the first message. In this way, for example, the system need not store each network operation (e.g., whether input nor output) to a given software application, but rather store log files generated based on the processing of the network operation to perform a validation process, thereby reducing the utilization of computer memory resources.

In some implementations, process 400 can determine a validation process to be performed by accessing a database configured to store a set of validation processes. For example, process 400 can identify that the first network operation originated from an originating software application and that the second network operation is to be provided to a destined software application using a format of (i) the first network operation and (ii) the second network operation. Each network operation (e.g., FIX message) may include a given set of tags (e.g., a format). For example, one FIX message may include Mandatory Tags, Compliance Tags, Regulatory Tags, and a Transformative Tag. However, another FIX message may include Mandatory Tags, Compliance Tags, and Regulatory Tags. As the FIX messages (e.g., network operations) are processed by varying software applications, the format of a given FIX message can indicate a software application that has processed, or will process a given FIX message. The system may then determine the validation process to be performed on the first message (e.g., the log message) by accessing a data structure configured to store a linked set of rules representing the validation process using an identifier associated with the originating software application and an identifier associated with the destined software application.

As an example, the originating software application may be a software application that has processed the first network operation, and the destined software application may be a software application that is to receive the second network operation. Process 400 can access a data structure based on an identifier associated with the originating software application and the destined software application to retrieve a validation process to be performed on the first message. The data structure may store a set of software application identifiers that are mapped to a given validation process. For example, the data structure may store a combination of software application identifiers (e.g., that indicate an originating software application and a destination software application) that are associated with a given validation process. In this way, the system may query the database to determine a validation process to be performed on the first message using the software application identifiers.

In some implementations, process 400 can determine the validation process to be performed on the first message based on a set of tags associated with the first message. For example, process 400 can extract, from the first message, a sender tag and a target tag, where the sender tag indicates an originating software application and the target tag indicates a destined software application. Process 400 may then identify that the first network operation originated from the originating software application using the sender tag and that the second network operation is destined to be provided to the destined software application using the target tag. Using the sender and target tags, Process 400 can access a data structure that is configured to store the set of validation processes, where each validation processes is mapped to a respective sender and respective target tags, to determine the validation process to be performed on the first message. For example, as discussed above, process 400 may query the database to determine a validation process to be performed on the first message, however, by using the tag values that are part of the first message (e.g., as opposed to the format of the first network operation or the second network operation).

At act 408, process 400 can perform the determined validation process. For example, process 400 can perform the determined validation process on the first message using (i) the first network operation, (ii) the second network operation, and (iii) the characteristics associated with the processing of the first network operation. For instance, process 400 may apply the validation process to the first message. As the validation process may be a set of rules (e.g., one or more rules, a set of linked rules, etc.), process 400 may extract one or more characteristics from the first message (e.g., the log file) to enable the validation process to validate one or more tag values (e.g., characteristics) of the first message. As another example, the validation process may be executed automatically and may compare one or more tag values of the first message. In some implementations, the validation process can compare corresponding tags (e.g., matching tags) between the first message, the first network operation, and the second network operation to provide a validation result (e.g., whether the first message is successfully validated, whether the first message has failed to successfully validate). In this way, the system determines whether a network operation is valid in real, or near-real time, thereby improving the user experience.

At act 410, process 400 can prevent the second network operation from being provided to the second software application in response to detecting that the determined validation process results in a failure to validate the first message. For example, as existing systems do not perform validation processes at each system (e.g., software application) a network operation may pass through or be processed by, one or more downstream systems until the network operation is completed. For instance, where a network operation involves 10 systems, if an error (e.g., a validation error, validation anomaly, etc.) occurs at an earlier system (e.g., systems 1-9), the error may not be detected until it reaches the $10^{th}$ system. This causes a waste of computational resources as each system has processed an error prone network operation. On the contrary, the conglomerate-application-based ecosystem may validate network operations at each system (e.g., software application, microservice software application) and can prevent a network operation from being transmitted to a downstream software application, thereby reducing the amount of wasted computational resources.

In some implementations, process 400 can enable the transmission of a network operation to another software application. For example, in response to the detection indicating a successful validation of the first message, process 400 can enable the second network operation to be transmitted to the second software application. For instance, where the first message is determined to be validated (e.g., no errors are present, no validation errors have occurred), process 400 can transmit the second network operation to the second software application for further processing. In this way, the system may reduce the amount of wasted computational resources as only network operations that are successfully validated are enabled to pass to a downstream system or software application.

In some implementations, process 400 can detect that the determined validation process results in a failure to validate the first message based on a missing characteristic. For instance, process 400 can determine a first characteristic of the set of characteristics of the first message. For example, the first characteristic may be a tag (e.g., a compliance tag, a mandatory tag, a transformative tag, a timestamp, etc.). Process 400 can then determine whether the second network operation comprises the first characteristic with respect to the first network operation using the linked set of rules (e.g., of a determined validation process). For example, the second network operation may include a timestamp tag that fails to indicate a timestamp value (e.g., a lack of a timestamp), and the first network operation may include a timestamp tag that indicates a second time. In response to the second network operation failing to comprise the first characteristic with respect to the first network operation, process 400 can detect that the determined validation process results in a failure to validate the first message (e.g., as the timestamp value is missing from the second network operation). As such, the system may invalidate the first message (e.g., the log file) based on a missing tag or missing tag value.

In some implementations, process 400 can generate an indication that a network operation has resulted in a failure to validate. For instance, although network operations may be validated at each system/software application, a current network operation being validated may have originated from another software application that is upstream (e.g., from an earlier system/software application). For example, an original network operation may be for a capital market trade. However, when passed through, or processed by the various software applications or other systems included in the conglomerate-application-based ecosystem, the trade may have been split up into 10 or more separate trades, each being processed by varying systems. As such, it is often difficult to provide an indication that an original network operation has failed to execute.

To overcome this however, as the messages (e.g., log messages) that are generated in response to a processing of network operations at each respective software application are stored in a database, process 400 may determine a set of historical messages, using the first message, where each historical message of the set of historical messages are associated with a processing of a respective network operation that is related to the first network operation. For example, where the first message has failed to be validated, process 400 may retrieve a set of historical messages (e.g., from the database) that are related to the first message.

Process 400 can determine the set of historical messages using the first message by extracting (i) a first network operation identifier associated with the first network operation and (ii) a third network operation identifier associated with a third software application that processed the third network operation to generate the first network operation. For example, process 400 may extract the first network operation identifier (e.g., a tag value that identifies the first network operation, an order ID, a trade ID, etc.) from the first message. Process 400 can also extract the third network operation identifier from the first message. For example, as the first message includes characteristics of a processing of the first network operation at the first software application, such as which software application the first network operation originated from (e.g., an upstream software application), process 400 can extract a third network operation identifier. The third network operation identifier may be an identifier that identifies a network operation that was processed by a software application that generated the first network operation. That is, the third network operation is a network operation that was generated prior to the generation of the first network operation.

Process 400 can then access a database storing the set of historical messages to parse the set of historical messages using (i) the first network operation identifier and (ii) the third network operation identifier to identify a first message of the second set of historical messages that corresponds to the first network operation identifier and the third network operation identifier. For example, process 400 can determine a log file that includes the identifier of both the third network operation identifier and the first network operation identifier. Process 400 may then determine the set of historical messages by adding the determined log file to the set of historical messages.

To clarify the above, where the set of historical messages is a set of historical log files generated based on the processing of each network operation at a given software application, each log file may include identifying information of each network operation that was processed at the given software application and the output that the processing of the network operation at the given software application generated. As such, process 400 can identify (i) the input network operation and (ii) the output network operation. Using this information, process 400 can iteratively check the set of historical log files based on the input network operation and the output network operation to create a set log files involved with the processing of a network operation that has failed to validate.

For example, referring to FIG. 1, a log file generated in response to the second software application's 104*b* processing of the second network operation 102*b* may have failed to validate. In response to detecting the failure to validate the generated log file, process 400 may access a database storing log files to determine a log file that indicates the second network operation 102*b* being the output of another software application (e.g., software application 104*a*). Upon determining a log file that indicates the second network operation 102*b* as being the output of the other software application (e.g., software application 104*a*), process 400 may extract a network operation identifier (e.g., first network operation 102*a*) that was the input network operation to the other software application (e.g., software application 104*a*). Process 400 can store such log files as a set of log files to generate a chain of log files that are related to the validation failure. Such process may repeat iteratively until process 400 fails to determine a log file that does not indicate an output network operation identifier (e.g., thereby indicating that the current log file is the first log file generated for a given network operation, thereby indicating the original network operation that is associated with the log message that failed to validate). In this example, first network operation 102*a* is the originating network operation that has resulted in a downstream failure to validate. In this way, the system may generate a set of historical log files that are related to the log message that failed to validate, thereby determining an original network operation that has failed to validate at later systems/software applications.

Using the set of historical messages (e.g., historical log files), process 400 can further identify a set of timestamps associated with each historical message of the set of historical messages. For example, process 400 may extract from each message (e.g., log file) a timestamp indicating when a respective log file was generated. Process 400 can then determine, by using the set of timestamps, a first historical message that is associated with a first timestamp that is earlier than other historical messages of the set of historical messages. For instance, process 400 may compare each timestamp of the set of historical messages to each other to determine the log message that was generated first. Process 400 can then extract from the earliest-generated message, an identifier associated with the originating (e.g., input) network operation. For example, the originating network operation may be the original capital market trade order before being processed by any of the systems within the conglomerate-application-based ecosystem. Process 400 may then generate for display at a graphical user interface (GUI), a message indicating (i) the identifier associated with the originating network operation and (ii) an indication that the originating network operation has resulted in a failure to validate. For example, the message that is generated for display at the graphical user interface may be a graphical notification that indicates that the original capital market trade has failed to be processed (or be validated).

In some implementations, process 400 can generate a response to a user-provided query. For example, although process 400 can detect network operations, or alternatively, messages (e.g., log files), failure to validate in real time, users such as data scientists, may want to analyze one or more aspects of the conglomerate-application-based ecosystem. Due to the difficulty in analyzing complex log files, regulations associated with capital market trades, validation processes, or other information, users may want to know specific answers to specific questions regarding the lifecycle of one or more network operations or trades that have occurred via the conglomerate-application-based ecosystem.

Figure 5:
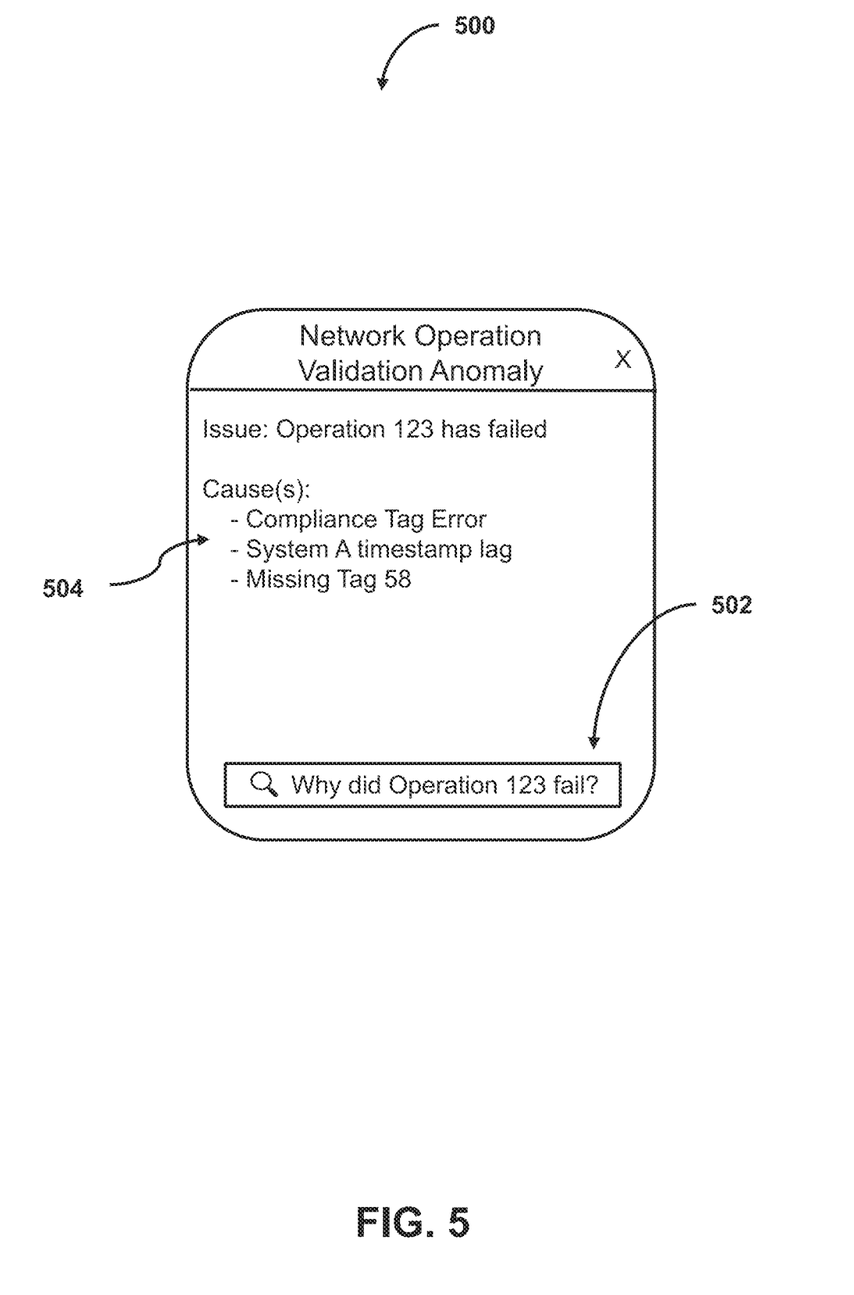
FIG. 5 shows an illustrative representation of a Graphical User Interface (GUI) for detecting network operation validation anomalies in conglomerate-application-based ecosystems, in accordance with some implementations of the present technology.

In particular, when diagnosing one or more network operation validation anomalies, failures, or other errors within the conglomerate-application-based ecosystem, a Large Language Model (LLM) may be particularly useful. For example, process 400 can receive, via a graphical user interface (GUI), a user-provided query, where the user-provided query indicates a request for message-related information (e.g., log message related information) that is associated with a processing of network operations. Referring to FIG. 5, a user interface 500 is provided. Process 400 may receive the user-provided query 502 which may indicate a question (e.g., "Why did Operation 123 fail"). As the log-files store characteristics regarding reasons for why a given network operation or log file has failed to validate (e.g., missing FIX tags, values, or other information), process 400 may provide the user-provided query to a LLM.

The LLM may be trained on (i) a set of validation processes (e.g., validation process rules) associated with validating network operations and (ii) a set of messages (e.g., log files) associated with a processing of network operations. The LLM may learn patterns, relationships, and statistical representations between the validation process rules and the set of messages (e.g., log files, historical log files, etc.) to provide responses to the user-provided queries. For instance, a given validation process may fail to validate a log file is a tag is missing. When the LLM is provided a user-provided query that is asking about a specific network operation, the LLM can generate a response to the user-provided query. For example, referring to FIG. 5, Operation 123 may have been missing a tag as indicated by a log file associated with the processing of operation 123. As such, the LLM may determine such missing tag (e.g., Missing Tag 58) based on the LLM's training and generate a response 504 to the user provided query indicating a message characteristic (e.g., of a log file) that corresponds to the user-provided query that is associated with the set of validation rules. For example, response 504 may include causes as to why a given operation has failed to validate.

In other implementations, however, the LLM is not limited to merely providing causes as to why a given network operation has failed to validate, but can also include providing requirements for given compliance standards, retrieve tag values that are associated with compliance standards, whether any software applications in the conglomerate-based-ecosystem is experiencing an error (or errors), or other information, in accordance with one or more implementations of the present technology.

Figure 6:
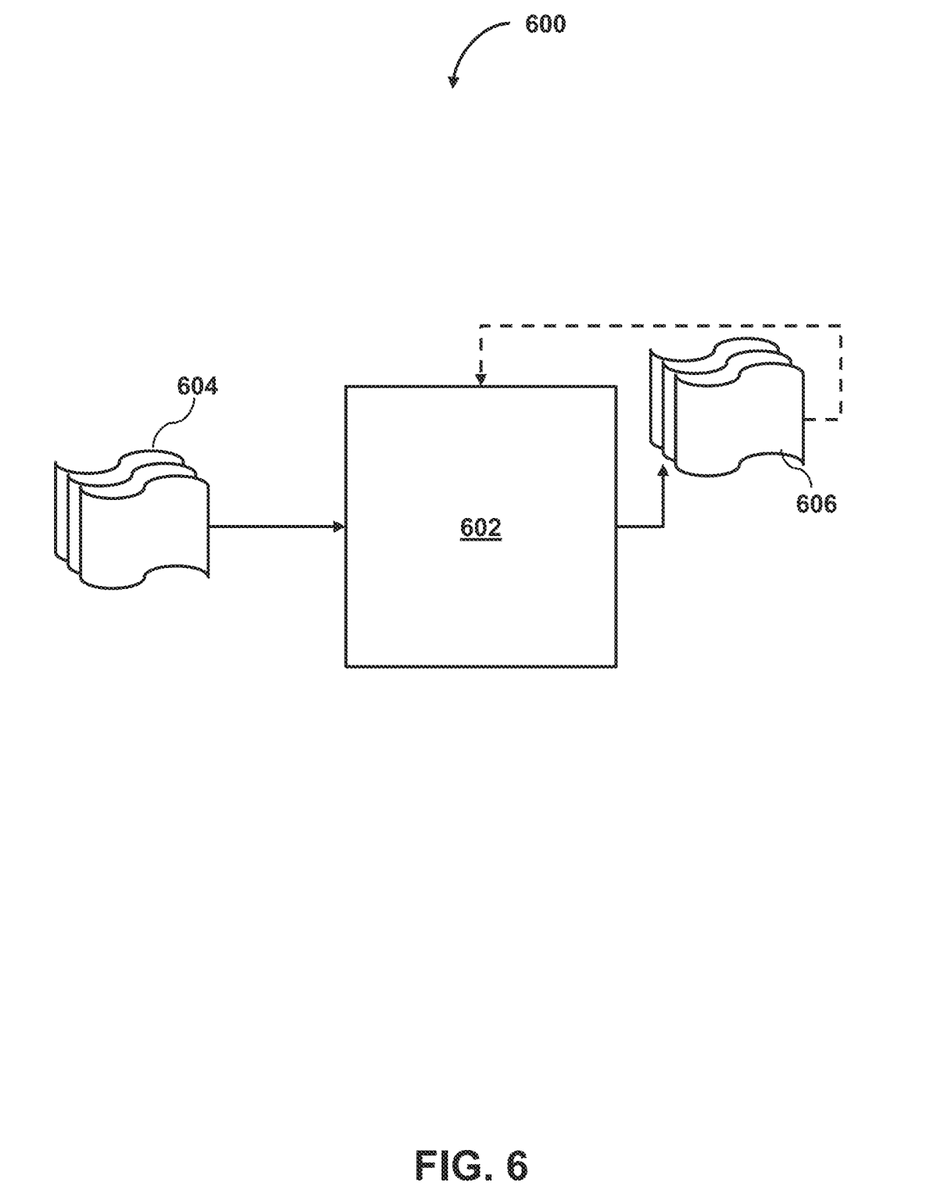
FIG. 6 shows a diagram of an artificial intelligence model for use in providing responses, in accordance with some implementations of the present technology.

Referring to FIG. 6., an artificial intelligence model is shown (e.g., model 602 which may be a machine learning model, artificial intelligence model, etc. (which may be referred collectively as "models" herein). Model 602 may take inputs 604 and provide outputs 606. The inputs may include multiple datasets, such as a training dataset and a test dataset. Each of the plurality of datasets (e.g., inputs 604) may include data subsets related to user data, predicted forecasts and/or errors, and/or actual forecasts and/or errors. In some embodiments, outputs 606 may be fed back to model 602 as input to train model 602 (e.g., alone or in conjunction with user indications of the accuracy of outputs 606, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a response to a user-provided query)

In a variety of embodiments, model 602 may update its configurations (e.g., weights, biases, or other parameters) based on the assessment of its prediction (e.g., outputs 606) and reference feedback information (e.g., user indication of accuracy, reference labels, or other information). In a variety of embodiments, where model 602 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 602 may be trained to generate better predictions.

In some embodiments, model 602 may include an artificial neural network. In such embodiments, model 602 may include an input layer and one or more hidden layers. Each neural unit of model 602 may be connected with many other neural units of model 602. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 602 may be self-learning and trained, rather than explicitly programmed, and can perform significantly better in certain areas of problem solving, as compared to traditional computer programs. During training, an output layer of model 602 may correspond to a classification of model 602, and an input known to correspond to that classification may be input into an input layer of model 602 during training. During testing, an input without a known classification may be input into the input layer, and a determined classification may be output.

In some embodiments, model 602 may include multiple layers (e.g., where a signal path traverses from front layers to back layers). In some embodiments, back propagation techniques may be utilized by model 602 where forward stimulation is used to reset weights on the "front" neural units. In some embodiments, stimulation and inhibition for model 602 may be more free-flowing, with connections interacting in a more chaotic and complex fashion. During testing, an output layer of model 602 may indicate whether or not a given input corresponds to a classification of model 602 (e.g., a response to a user provided query).

In some embodiments, the model (e.g., model 602) may automatically perform actions based on outputs 606. In some embodiments, the model (e.g., model 602) may not perform any actions. The output of the model (e.g., model 602) may be used to indicate to a user information pertaining to a network operation validation anomaly.

In some embodiments, the model (e.g., model 602) may be an LLM model. For example, the LLM model may receive a large corpus of text (e.g., a set of validation processes (e.g., validation process rules) associated with validating network operations, a set of messages (e.g., log files) associated with a processing of network operations, user provided queries, or other information) as inputs 604 to generate an output 606. Output 606 may be a response to a user provided query. The LLM model (e.g., model 602) may learn patterns, relationships, and statistical representations between the validation process rules and the set of messages (e.g., log files, historical log files, etc.) to provide responses to the user-provided queries. In some implementations, the responses to the user-provided queries (e.g., outputs 606) may be fed back into the LLM model as reference feedback information to further train model 602.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for reducing wasted computational resources by detecting network operation validation anomalies in conglomerate-application-based ecosystems, the system comprising:

at least one hardware processor; and at least one non-transitory memory storing instructions, which, when executed by the at least one hardware processor, cause the system to:

detect a transmission of a first network operation to a first microservice software application of a set of microservice software applications, wherein (i) the first network operation is configured to be provided as input to the first microservice software application and (ii) the first microservice software application generates a second network operation as output, using the first network operation, to be transmitted to a second microservice software application of the set of microservice software applications;

receiving a first log file associated with a processing of the first network operation at the first microservice software application, wherein the first log file indicates a set of modifications between the first network operation and the second network operation associated with the processing of the first network operation;

storing, in a database, the first log file in association with the first microservice software application;

in response to storing the first log file, identifying that the first network operation originated from an originating microservice software application and that the second network operation is destined to be provided to a destined microservice software application using a format of (i) the first network operation and (ii) the second network operation;

determining a validation process to be performed on the first log file by accessing a data structure configured to store a linked set of rules representing the validation process using an identifier associated with the originating microservice software application and an identifier associated with the destined microservice software application;

retrieving, from the database, the first log file to perform the determined validation process on the first log file with respect to the set of modifications using (i) the first network operation and (ii) the second network operation; and in response to detecting that the determined validation process results in a failure to validate the first log file, preventing the second network operation from being transmitted to the second microservice software application of the set of microservice software applications, wherein detecting that the determined validation process results in the failure to validate the first log file comprises:

determining a first modification of the set of modifications of the first log file;

determining whether the second network operation comprises the first modification with respect to the first network operation using the linked set of rules; and in response to the second network operation failing to comprise the first modification with respect to the first network operation, detecting that the determined validation process results in a failure to validate the first log file.

2. The system of claim 1, further comprising the instructions to:

in response to the detection indicating a successful validation of the first log file, enabling the second network operation to be transmitted to the second microservice software application.

3. The system of claim 1, further comprising the instructions to:

in response to detecting that the validation process results in the failure to validate the first log file, generating for display at a graphical user interface (GUI), a message indicating the failure to validate the first log file.

4. A method for reducing wasted computational resources by detecting network operation validation anomalies in conglomerate-application-based ecosystems, the method comprising:

providing a first network operation to a first software application of a set of software applications, wherein (i) the first network operation is configured to be provided as input to the first software application and (ii) the first software application generates a second network operation as output, using the first network operation, to be provided to a second software application of the set of software applications;

receiving a first message associated with a processing of the first network operation at the first software application, wherein the first message indicates a set of characteristics associated with the processing of the first network operation;

identifying that the first network operation originated from an originating software application and that the second network operation is destined to be provided to a destined software application using a format of (i) the first network operation and (ii) the second network operation;

determining a validation process to be performed on the first message by accessing a data structure configured to store a linked set of rules representing the validation process using an identifier associated with the originating software application and an identifier associated with the destined software application;

performing the determined validation process on the first message using (i) the first network operation, (ii) the second network operation, and (iii) the characteristics associated with the processing of the first network operation; and in response to detecting that the determined validation process results in a failure to validate the first message, preventing the second network operation from being provided to the second software application of the set of software applications, wherein the determined validation process results in the failure to validate the first message is detected, and wherein detecting that the determined validation process results in the failure to validate the first message further comprises:

determining a first characteristic of the set of characteristics of the first message;

determining whether the second network operation comprises the first characteristic with respect to the first network operation using the linked set of rules; and in response to the second network operation failing to comprise the first characteristic with respect to the first network operation, detecting that the determined validation process results in a failure to validate the first message.

5. The method of claim 4, further comprising:

in response to the detection indicating a successful validation of the first message, enabling the second network operation to be transmitted to the second software application, wherein the successful validation of the first message is detected.

6. The method of claim 4, further comprising:

in response to detecting that the validation process results in the failure to validate the first message, generating for display at a graphical user interface (GUI), a message indicating the failure to validate the first message, wherein the validation process resulting in the failure to validate the first message is detected.

7. The method of claim 4, wherein determining the validation process to be performed on the first message further comprises:

extracting, from the first message, a sender tag and a target tag, wherein the sender tag indicates the originating software application and the target tag indicates the destined software application;

identifying that (i) the first network operation originated from the originating software application using the sender tag and (ii) the second network operation is destined to be provided to the destined software application using the target tag; and accessing a data structure configured to store a set of validation processes mapped to respective sender and respective target tags, using the sender tag and the target tag, to determine the validation process to be performed on the first message.

8. The method of claim 4, further comprising:

determining a set of historical messages, using the first message, wherein each historical message of the set of historical messages are associated with a processing of a respective network operation that is related to the first network operation;

identifying a set of timestamps associated the set of historical messages;

determining, by using the set of timestamps associated with the set of historical messages, a first historical message that is associated with a first timestamp that is earlier than other historical messages of the set of historical message's timestamps;

extracting, from the first historical message, an identifier associated with an originating network operation, wherein the originating network operation originated the first network operation; and generating for display at a graphical user interface (GUI), a message indicating (i) the identifier associated with the originating network operation and (ii) an indication that the originating network operation has resulted in a failure to validate.

9. The method of claim 8, wherein determining the set of historical messages using the first message further comprises:

extracting, (i) a first network operation identifier associated with the first network operation and (ii) a third network operation identifier associated with a third software application that processed the third network operation to generate the first network operation, from the message;

accessing a database storing a second set of historical messages, wherein the second set of historical messages indicates characteristics associated with the processing of network operations;

parsing the second set of historical messages using (i) the first network operation identifier and (ii) the third network operation identifier to identify a first message of the second set of historical messages that corresponds to the first network operation identifier and the third network operation identifier; and adding the identified first message of the second set of historical messages to the determined set of historical messages.

10. The method of claim 4, further comprising:

receiving, via a graphical user interface (GUI), a user-provided query, wherein the user-provided query indicates a request for message-related information associated with a processing of network operations;

providing the user-provided query to a Large Language Model (LLM) trained on a (i) a set of validation process rules associated with validating network operations and (ii) a set of messages associated with a processing of network operations to generate an output using the user-provided query; and generating, via the graphical user interface (GUI), a response to the user-provided query using the generated output, wherein the response indicates a message characteristic corresponding to the user-provided query that is associated with the set of validation process rules.

11. One or more non-transitory computer-readable media storing instructions that, when executed by one or more processors, cause operations comprising:

providing a first network operation to a first software application of a set of software applications, wherein (i) the first network operation is configured to be provided as input to the first software application and (ii) the first software application generates a second network operation as output, using the first network operation, to be provided to a second software application of the set of software applications;

receiving a first message associated with a processing of the first network operation at the first software application, wherein the first message indicates a set of characteristics associated with the processing of the first network operation;

identifying that the first network operation originated from an originating software application and that the second network operation is destined to be provided to a destined software application using a format of (i) the first network operation and (ii) the second network operation;

determining a validation process to be performed on the first message by accessing a data structure configured to store a linked set of rules representing the validation process using an identifier associated with the originating software application and an identifier associated with the destined software application;

performing the determined validation process on the first message using (i) the first network operation, (ii) the second network operation, and (iii) the set of characteristics associated with the processing of the first network operation; and in response to detecting that the determined validation process results in a failure to validate the first message, preventing the second network operation from being provided to the second software application of the set of software applications, and wherein detecting that the determined validation process results in the failure to validate the first message further comprises:

determining a first characteristic of the set of characteristics of the first message;

determining whether the second network operation comprises the first characteristic with respect to the first network operation using the linked set of rules; and in response to the second network operation failing to comprise the first characteristic with respect to the first network operation, detecting that the determined validation process results in a failure to validate the first message.

12. The media of claim 11, wherein the instructions, when executed by the one or more processors, further cause operations comprising:

in response to the detection indicating a successful validation of the first message, enabling the second network operation to be transmitted to the second software application.

13. The media of claim 11, wherein the instructions, when executed by the one or more processors, further cause operations comprising:

in response to detecting that the validation process results in the failure to validate the first message, generating for display at a graphical user interface (GUI), a message indicating the failure to validate the first message.

14. The media of claim 11, wherein determining the validation process to be performed on the first message further comprises:

extracting, from the first message, a sender tag and a target tag, wherein the sender tag indicates the originating software application and the target tag indicates the destined software application;

identifying that (i) the first network operation originated from the originating software application using the sender tag and (ii) the second network operation is destined to be provided to the destined software application using the target tag; and accessing a data structure configured to store a set of validation processes mapped to respective sender and respective target tags, using the sender tag and the target tag, to determine the validation process to be performed on the first message.

* * * * *